United States Patent
Van Deursen et al.

(10) Patent No.: US 10,617,067 B2
(45) Date of Patent: Apr. 14, 2020

(54) FASTENING SYSTEM AND SCREEN INSTALLATION FOR A GREENHOUSE, AS WELL AS METHOD FOR ATTACHING THE SAME

(71) Applicant: Van der Valk Systemen B.V., Monster (NL)

(72) Inventors: Adrianus Gerardus Van Deursen, Voorschoten (NL); Johan Martien Broos, Naaldwijk (NL); Vincent Prins, Oude Wetering (NL)

(73) Assignee: Van der Valk Systemen B.V., Monster (NL)

( * ) Notice: Subject to any disclaimer, the term of this patent is extended or adjusted under 35 U.S.C. 154(b) by 0 days.

(21) Appl. No.: 15/307,836

(22) PCT Filed: Apr. 30, 2015

(86) PCT No.: PCT/NL2015/050291
§ 371 (c)(1),
(2) Date: Oct. 31, 2016

(87) PCT Pub. No.: WO2015/167334
PCT Pub. Date: Nov. 5, 2015

(65) Prior Publication Data
US 2017/0086392 A1    Mar. 30, 2017

(30) Foreign Application Priority Data

Apr. 30, 2014  (NL) .................................... 2012719

(51) Int. Cl.
*E04F 10/02*   (2006.01)
*A01G 9/24*    (2006.01)
(Continued)

(52) U.S. Cl.
CPC .......... *A01G 9/242* (2013.01); *A01G 9/1476* (2013.01); *A01G 9/22* (2013.01); *E04D 11/00* (2013.01);
(Continued)

(58) Field of Classification Search
CPC ........ A01G 9/22; E04F 10/02; E04F 10/0633; B60J 7/0015; B60J 1/2052; B60R 5/047; E06B 9/42
See application file for complete search history.

(56) References Cited

U.S. PATENT DOCUMENTS 3,116,097 A * 12/1963 Novales .................. E06B 9/581
                                                    160/271
4,697,326 A * 10/1987 Faircloth ................. A01G 9/22
                                                    160/378
(Continued)

FOREIGN PATENT DOCUMENTS

GB    2251777 A    7/1992
NL    8105447 A    7/1983
(Continued)

OTHER PUBLICATIONS

Google english language translation of NL2002319.*

*Primary Examiner* — Brian E Glessner
*Assistant Examiner* — Daniel J Kenny
(74) *Attorney, Agent, or Firm* — N.V. Nederlandsch Octrooibureau; Catherine A. Shultz; Katelyn J. Bernier

(57) ABSTRACT

A screen installation comprising a screen cloth assembly (22) with a screen cloth (7) and at least one flat strip (21) fastened to the screen cloth, as well as screen sections (8, 18), to opposite edges of the screen cloth, at least one screen section of which has an undercut chamber (20) and a longitudinal opening (23) that opens into this chamber, wherein the strip is accommodated in the chamber of the at least one screen section so that the screen cloth fastened to (Continued)

it can extend outwards from it through the longitudinal opening of the screen section. The strip (21) is fastened at a distance from the adjacent free edge of the screen cloth (7) in the form of a free screen cloth flap (19). The screen cloth flap extends from the strip and via the longitudinal opening (23) of the at least one screen section (8, 18) outwards from it.

20 Claims, 4 Drawing Sheets

(51) Int. Cl.
| | | |
|---|---|---|
| *A01G 9/22* | (2006.01) | |
| *A01G 9/14* | (2006.01) | |
| *E04D 11/00* | (2006.01) | |
| *E04D 13/00* | (2006.01) | |
| *E04D 13/064* | (2006.01) | |
| *E04H 5/02* | (2006.01) | |
| *E04H 5/08* | (2006.01) | |

(52) U.S. Cl.
CPC ......... *E04D 13/004* (2013.01); *E04D 13/064* (2013.01); *E04H 5/02* (2013.01); *E04H 5/08* (2013.01); *Y02A 40/258* (2018.01)

(56) References Cited

U.S. PATENT DOCUMENTS

| | | | | |
|---|---|---|---|---|
| 7,950,440 | B2* | 5/2011 | Rockelmann | B60J 1/2041 |
| | | | | 160/273.1 |
| 8,347,550 | B2* | 1/2013 | De Koning | A01G 9/22 |
| | | | | 47/17 |
| 8,690,234 | B2* | 4/2014 | Rockelmann | B60J 7/0015 |
| | | | | 296/214 |
| 8,955,575 | B2* | 2/2015 | Glasl | B60J 1/2041 |
| | | | | 160/273.1 |
| 9,840,134 | B2* | 12/2017 | Van Boxtel | B60J 7/0015 |
| 2013/0186578 | A1* | 7/2013 | Lin | E06B 9/42 |
| | | | | 160/271 |

FOREIGN PATENT DOCUMENTS

| | | |
|---|---|---|
| NL | 1011546 C2 | 11/2000 |
| NL | 2002319 C | 6/2010 |
| NL | 2002621 C | 9/2010 |
| WO | 2009057999 A1 | 5/2009 |

\* cited by examiner

FASTENING SYSTEM AND SCREEN INSTALLATION FOR A GREENHOUSE, AS WELL AS METHOD FOR ATTACHING THE SAME

TECHNICAL FIELD

The invention relates to a fastening system, comprising a flexible sheet member and at least one flat strip attached to the flexible member with main surfaces that face away and are parallel to each other, as well as at least one fastening section that has an undercut chamber and a longitudinal opening that opens into this chamber, wherein the strip is accommodated in the chamber of that fastening section in such a way that one of the main surfaces thereof is oriented towards the longitudinal opening and the other main surface faces away from the longitudinal opening and such that the flexible member fastened to the strip extends outwards from the fastening section via the longitudinal opening thereof.

BACKGROUND ART

Such a fastening system is known from NL-C-1034598. The flexible sheet members applied therein, in particular screen cloths, normally consist of a series of film bands extending adjacent to each other, which are interconnected by strips or wires extending transversely. On the edge of the screen cloth, a relatively rigid strip is accommodated in the screen cloth, which is slid from one extremity of the fastening section, in particular a screen section, into the undercut chamber of the same. The strip is accommodated in the weave or knit of the screen cloth. As an alternative embodiment, a sheet screen is mentioned, in which the strip may be fastened by welding, stitching, or the like. Such an embodiment of the fastening system has the aim of inserting a relatively long screen cloth assembly efficiently into the screen sections.

A disadvantage of this known fastening system, however, is that the forces required for pulling the screen cloth assembly into the screen sections are quite high. This applies to a greater extent to large greenhouses, in other words, greenhouses where the screen installations extend over longer distances. The film material and the knit or weave of the screen cloth, when pulled into the screen sections, exert a relatively high friction resistance in relation on the internal walls of the undercut chamber of the screen sections, as a result of which there is a threat of the tensile forces becoming too high during insertion.

Furthermore, from NL-C-1011546, a fastening system is known consisting of screen sections with an undercut chamber and a screen cloth to which fastening profiles are fastened which have a barbed hook shape. These fastening sections must be pressed transversely into the undercut chamber of the screen section. Especially with long screen cloths, such a method for attaching the screen cloth is very labour-intensive. After all, the staff must access the screen sections over the entire length to press in the strips. That is a laborious approach, in particular because of the relatively high position which the screen sections can assume in the greenhouse. A further disadvantage of this known screen installation is that the screen cloth with the fastened sections is not easy to roll up. Due to their barbed hook shape, the sections necessarily have quite a large thickness and consequently resist the bending that is needed to roll up the screen cloth assembly to an acceptable diameter.

BRIEF DESCRIPTION OF THE INVENTION

One aim of the invention is therefore to create a fastening system of the type described herein above, which may also be installed efficiently and with manageable forces in the case of larger dimensions. According to a first aspect of the invention, that aim is achieved by fastening the flexible sheet member to the main surface of the strip that is facing the longitudinal opening, at a fastening position that is located at the level of the longitudinal opening, and keeping free at least the other main surface of the strip, and that the strip is located at a distance from a free edge of the sheet member forming a free flap that is defined between this strip and the free edge of the sheet member, which flap extends from the fastening position on the strip into the longitudinal opening.

In the fastening system according to the invention, essentially only the strip that is fastened to the sheet member is located in the undercut chamber of the fastening profile. The sheet member runs through the opening inwards into the undercut chamber, yet is fastened there to the part of the strip that does not come into contact with the internal walls of the chamber. Similarly, the flap is fastened to the strip there, yet this also can extend out of the chamber through the opening to the outside. However, that is not necessary: it is also possible that a relatively short flap is located in the longitudinal opening without protruding outwards from it.

More particularly, the surface of the strip oriented towards the longitudinal opening may directly abut, or can be brought to directly abut against, the internal surface of the chamber on opposite sides of the longitudinal opening thereof. Consequently, only one part of the external surface of the strip comes into contact with the internal walls of the chamber, and while pulling the sheet member further into the chamber with the strip, friction is exerted only between the strip and the chamber. For this purpose, the strip may be implemented in a material that exhibits a relatively low coefficient of friction with respect to the material from which the fastening section, in particular that part thereof that delimits the undercut chamber, is made. The fastening system is consequently also suitable for longer screen installations since that the friction forces remain limited. That is also the case if a short piece of the flap were to be situated between the strip and the chamber.

A further advantage of the invention is that the undercut chamber remains protected against the growth of algae. The growth of algae is mostly limited to the sheet member, which however is not or barely situated inside the undercut chamber.

The flat strip preferably has a total thickness dimension which is at least one order of magnitude smaller than the width thereof. Furthermore, the sheet member is preferably fastened to the strip by means of an attachment such as obtained by stitching, adhesion, riveting, or the like, which extends preferably in the middle of the strip, viewed in the widthwise direction of the strip. However, a fastening outside the middle of the strip is also possible.

The fastening between the sheet member and the strip may be located on surfaces of the sheet member and the strip that are facing each other. Such an implementation may be very easily rolled up into a relatively small roll. After all, the strips exhibit a low bending stiffness with regard to the deformations transverse to the plane that is defined by the longitudinal direction and widthwise direction thereof, so that they hardly form an obstruction to rolling up. This is not only relevant for handling and transport, but also makes it possible to position the thus rolled-up assembly into the greenhouse under construction and to gradually unroll it when inserting the assembly into the screen sections. An advantage is also achieved when removing the assembly; it can actually be rolled up with a relatively small diameter.

The circumference of the strip, transverse to the longitudinal direction of the same, is preferably rectangular. Such a flat strip may, on the one hand, be easy to bend, while, on the other hand, may provide a good resistance inside the undercut chamber for holding the screen cloth therein. However, the strip does not always have to be completely flat and may, for example, exhibit a small curvature, viewed in the transverse cross-section. Such a strip may, nevertheless, be properly rolled up, even if the curvature is made to disappear due to the rolling up. The at least one fastening section may have an undercut chamber with an essentially rectangular or square internal transverse cross-section, wherein the opening is preferably located in the centre of one of the walls delimiting the chamber. However, a position of the longitudinal opening outside the centre of the respective wall is also possible.

The fastening system may, in particular, be adapted to a screen installation for a greenhouse or warehouse. Such a screen installation comprises a screen as well as screen sections on opposite edges of the screen, wherein at least one of the screen sections is fastened to the screen by means of such a fastening system.

Preferably, a further strip is located on the screen and a further screen section with an undercut chamber and a longitudinal opening that opens into this chamber is provided, wherein the further strip is accommodated in the chamber of that further screen section in such a way that the screen fastened thereto extends outwards from the further screen section through the longitudinal opening thereof. The flap may also protrude outwards, or extend in the longitudinal opening. More preferably, the widthwise direction of the strip is oriented transverse, preferably at approximately 90°, with respect to the screen. In this configuration, the friction between the screen assembly consisting of the screen and the strip on the one hand, and the screen section on the other hand, is as low as possible.

Preferably at least one of the screen sections is supported so that it can be displaced back and forth with regard to the other screen section. It is also possible to support both screen section similarly displaceable in relation to each other.

The transverse cross-sectional dimensions of the strip and the transverse cross-sectional dimensions of the chamber are preferably selected in such a way that the strip is locked into the chamber to prevent the strip from leaving the chamber via the longitudinal opening thereof. In that case, the chamber of each screen section on at least one longitudinal end thereof is open for sliding a strip into the chamber with screen cloth and screen cloth flap fastened to the same.

A second aspect of the invention relates a greenhouse or warehouse comprising a roof, a supporting structure on which the roof is supported as well as a screen installation as described above. This screen installation may have fixed screen sections. According to an alternative embodiment, one or both screen sections may be displaceable, in which case the supporting structure is provided with a wire apron by means of which a minimum of one of the screen sections and the screen assembly are supported so they can be displaced back and forth, as well as a driving mechanism for displacing that at least one screen section and the screen assembly back and forth.

A third aspect of the invention relates to a greenhouse or warehouse, comprising a supporting structure as well as a roof supported on it. The roof may be implemented as a flexible sheet member that is fastened on opposite edges thereof to the supporting structure in each case by means of a fastening system such as described above. Such a greenhouse is also referred to as a "film greenhouse". The flexible sheet member may be supported by a series of arch-shaped elements located at a distance apart.

According to another option, the roof has a translucent cover layer, as well as a translucent flexible sheet member that extends at a distance from, and essentially parallel to, the cover layer. In that case, the flexible sheet member and the cover layer jointly create an insulating effect. The translucent cover layer may also comprise such a flexible sheet member, such as a film layer, that may or may not be suspended by means of the fastening system according to the invention, but may also comprise a conventional cover layer with rods and glass panels.

A further aspect of the invention relates to an assembly for use in the greenhouse as described above, comprising a flexible sheet member and at least one flat strip fastened to the flexible sheet member, which strip extends along the longitudinal direction of the flexible sheet member, wherein the flexible sheet member is fastened to the strip by means of a linear fastening, such as obtained by stitching, adhesion, melting, riveting, or the like, which extends essentially in the centre of the strip, viewed in the widthwise direction of the strip. A position of the attachment outside the centre of the strip is also possible. Furthermore, the invention relates to a roll, comprising such an assembly that is rolled up according to a roll centre line that extends transverse to the longitudinal direction of the flexible sheet member.

The flexible sheet member may thus be fitted at various positions in a greenhouse or warehouse. This may be a screen cloth that extends horizontally under the roof, with the purpose of insulating the culture from cooling overnight, or protecting it against sunlight. Another possible application of the flexible sheet member relates to the formation of an insulating cavity under the normal cover of the greenhouse, such as a cover with glass panels. The flexible sheet member is in that case slantingly oriented, corresponding to the slope of the glass panels. Such a flexible sheet member may, for example, be made from a film. Alternative embodiments are those made of a knitwork, a woven fabric, or film bands combined with a knit or web.

The invention also relates to a method for assembling a fastening system, comprising the steps of:

creating an assembly comprising a flexible sheet member and at least one flat strip fastened to the flexible sheet member, which strip is fastened at a distance from the adjacent free edge of the flexible sheet member forming a free flap, providing a fastening section that has an undercut chamber and a longitudinal opening that opens out into this chamber, inserting the assembly into the free longitudinal end of the fastening section so that one end of the strip and the flexible sheet member fastened thereto and the flap fastened thereto reach into a free or open longitudinal end of a fastening section, and the sheet member projects outwards from the longitudinal opening, and moving the assembly thus inserted into the fastening section along the fastening section.

In particular, the method may also comprise the steps of:

creating an assembly in the form of a roll, the roll centreline of which is oriented transverse to the longitudinal direction of the strip, placing the roll close to a free longitudinal end of the screen section, and unrolling the assembly of the roll and transferring the unrolled end of the assembly to that free or open longitudinal end of the fastening section.

The method may also, preferably, comprise the steps of:

after unrolling the assembly, orienting the widthwise direction of the strip transversely to the flexible sheet member, folding or turning over the flap in relation to the flexible sheet member, and subsequently introducing the strip into the fastening section.

This provides the possibility of equipping the assembly from the factory with strips, and transporting in a rolled state to the relevant greenhouse. There, the screen assembly is unrolled and installed into the relevant fastening sections.

The fastening section may have an integral undercut chamber and, for example, be implemented as an extrusion section. According to an alternative embodiment, the undercut chamber may form part of a fastening section that is fastened to a main section that is in turn suspended on the roof structure.

BRIEF DESCRIPTION OF THE FIGURES

In the following, illustrative examples will be described exclusively by means of example using the accompanying schematic drawings, wherein corresponding components are indicated by corresponding reference symbols.

The drawings are only intended for illustrative purposes, and do not serve to restrict the scope of protection that is defined by the claims.

DESCRIPTION OF THE EMBODIMENTS

Figure 1:
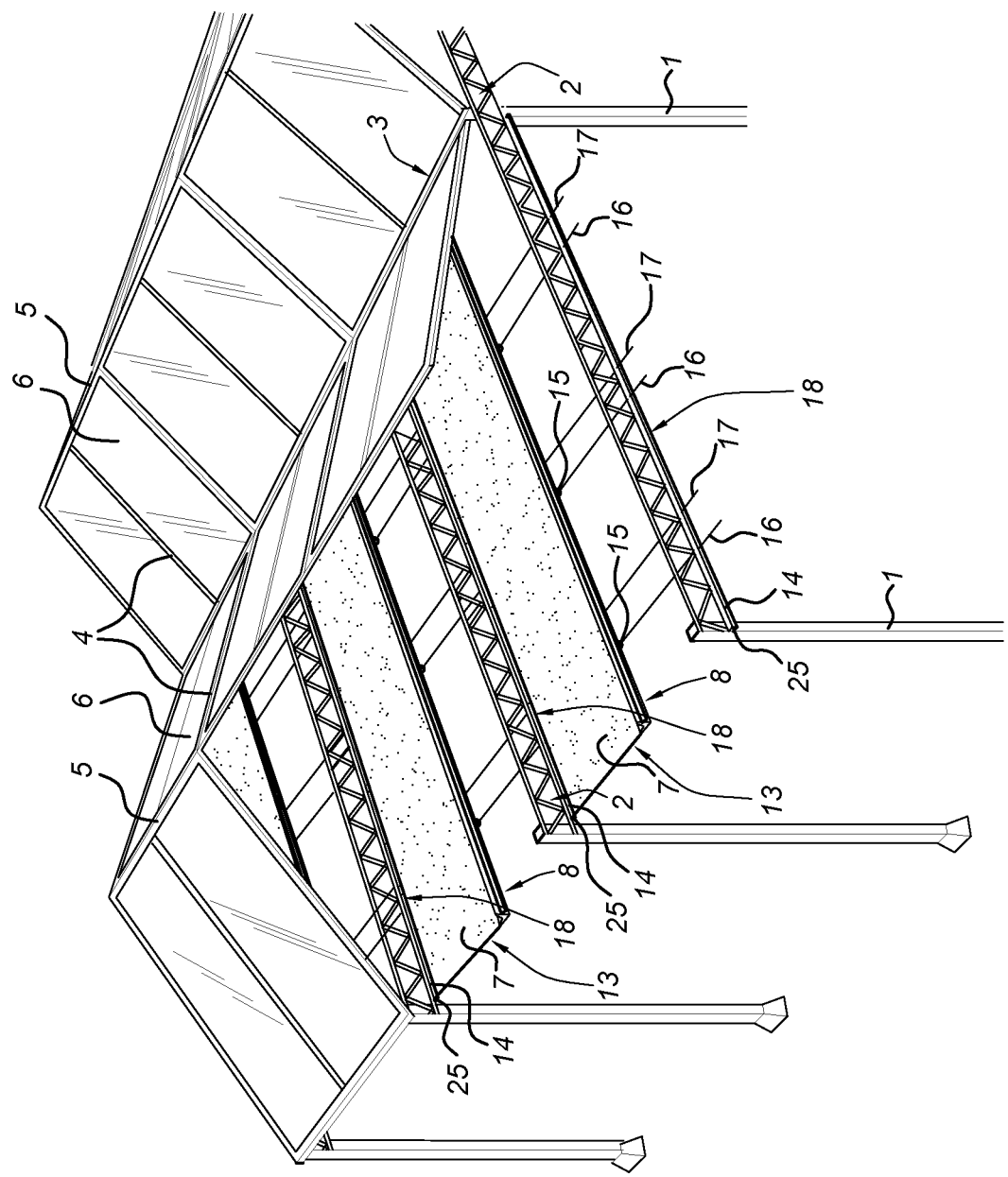
FIG. 1 shows a greenhouse with a screen installation according to an embodiment.

The greenhouse shown in FIG. 1 comprises a number of columns 1 on which rafters 2 are supported. The roof structure is supported on these rafters 2. This roof structure comprises gutter 3 in relation to which rods 4 are oriented slantingly upwards. The ridges 5 are supported on the rods 4. Between these rods 4, the gutters 3 and the ridges 5, glass plates 6 are accommodated.

In this greenhouse structure, at the level of the beams 2, the screen installation 13 according to the invention is attached. This screen installation 13 comprises a number of screen cloths 7 in a known way, one end of which is also connected to the fixed screen section 18 that is suspended on the under-girder 14 that forms a part of the rafters 2. The other end of the screen cloths 7 is connected to the screen sections 8, which are displaceable in a known way each between two beams 2. In connection with that, the screen sections 8 are connected by means of a known coupling 15 to the wire-shaped driving means 16. These driving means 16 ensure that the screen cloths 7 may be transferred between a closed and an opened position: in FIG. 1 an intermediate position is illustrated. The screen cloths 7 are supported against sagging by the wires 17. Also above the screen cloths 7, wires 17 are provided for preventing the former from being blown upwards.

Figure 2:
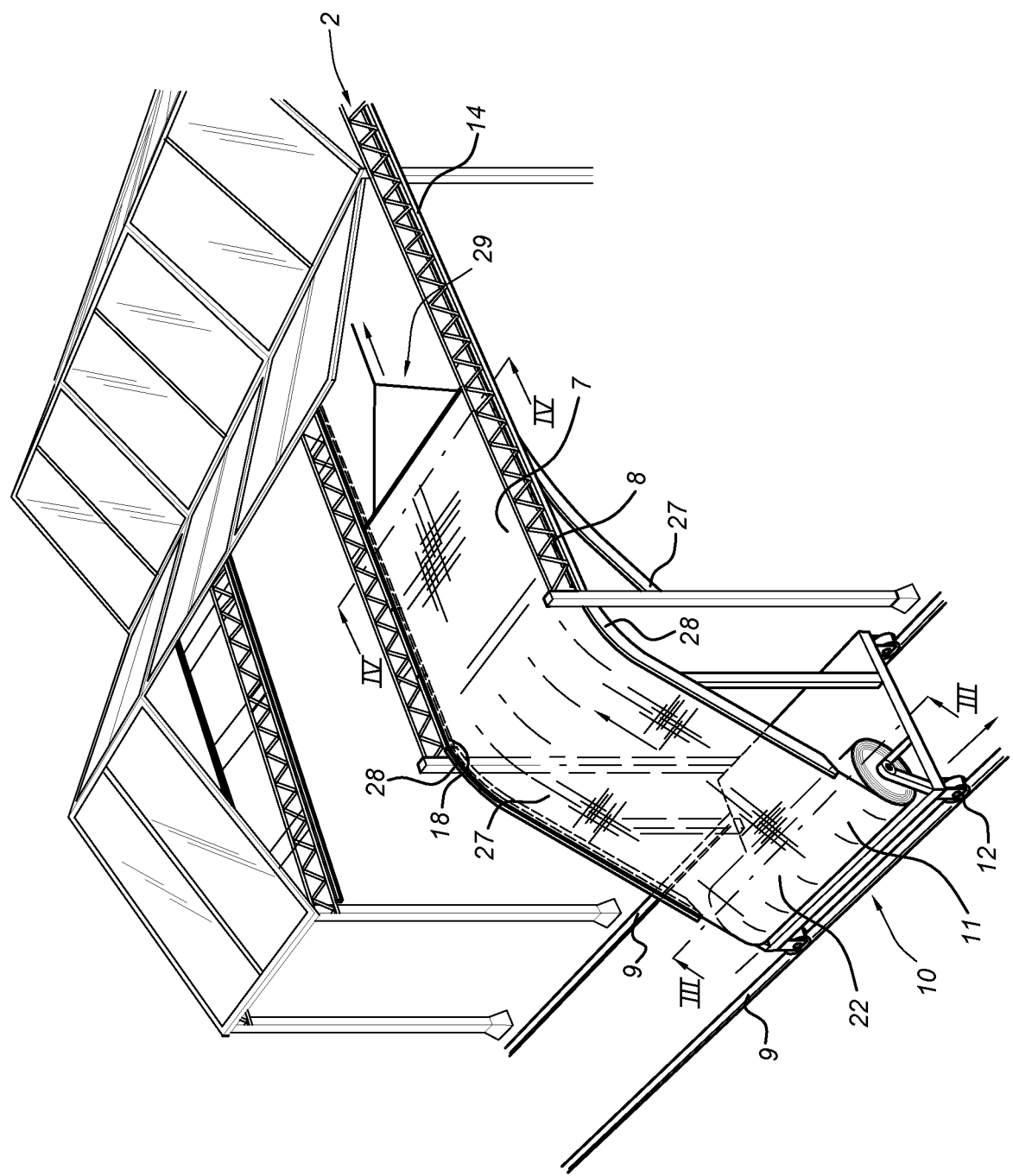
FIG. 2 shows an embodiment of a method of installing a screen cloth assembly into a greenhouse.

In connection with installing the screen installation in the greenhouse, work proceeds as follows. First of all, the screen sections 8 and 18 are applied to the intended location. The fixed screen section 18 is fastened to the under-girder 14 of the rafter 2. The moveable screen section is placed near the opposite girder 14, so that the lip 26 thereof abuts against this under-girder: see FIGS. 2 and 4.

Figure 3:
FIG. 3 shows the cross-section through the screen cloth assembly according to III-III of FIG. 2.
Figure 4:
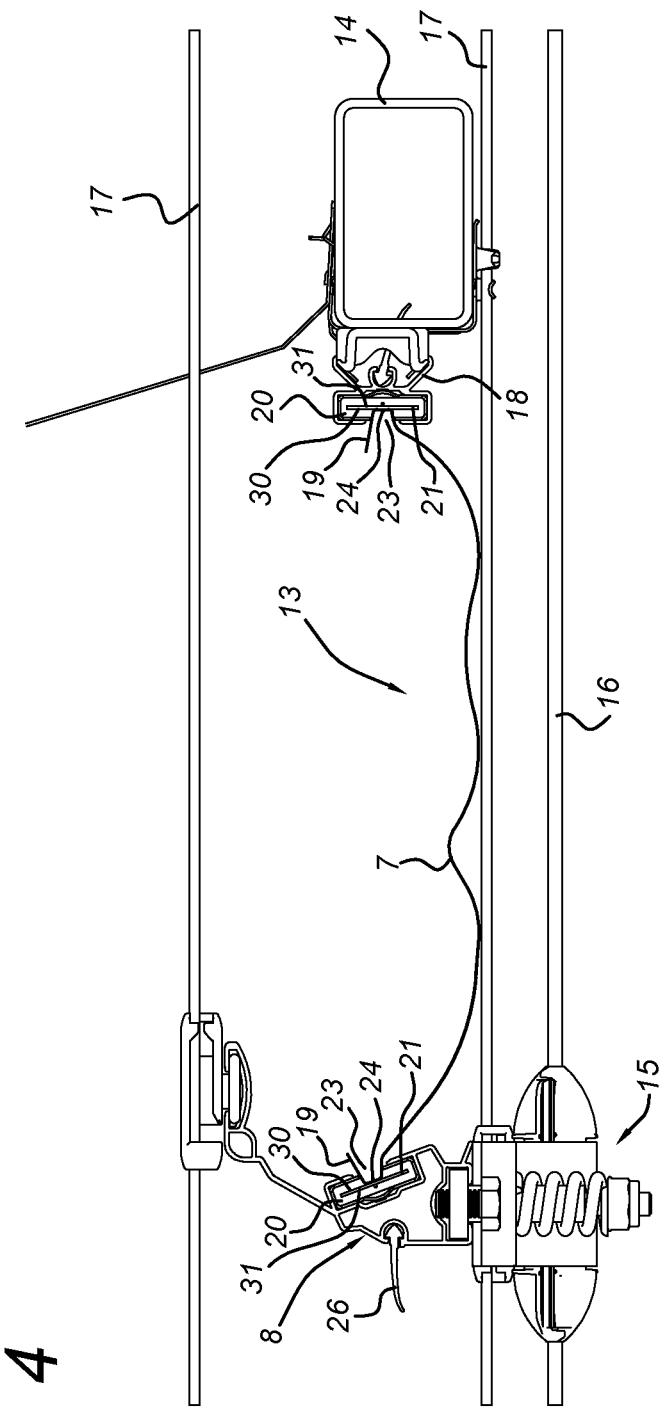
FIG. 4 shows the cross-section through the screen installation according to IV-IV of FIG. 2.

With this, an installation is employed including a vehicle 10 onto which a roll 11 is placed, which includes the assembly 22 of the screen cloth 7 and the strips 21 fastened thereto. FIG. 3 shows this assembly 22 in transverse cross-section. By means of the fastening 24, one side of the screen cloth 7 is fastened to the main surface 30 of each strip 21, while keeping free the other main surface 31 of the strip 21. The vehicle 10 has wheels 12, so that it is drivable along e.g. the heating pipes 9 or other rails which are located on the floor in a greenhouse. Therefore, the vehicle 10 may be placed next to each pair of rafters 14, as shown in FIG. 4.

In connection with the attachment of the assembly 22, the relevant screen section 8 as mentioned is moved up to the rafter 14 that is located opposite to the rafter 14 to which the fixed section 18 is fastened. The assembly 22 is then unrolled, wherein the strips 21 thereof are gradually rotated until they come to an upright state. For example, this may be achieved by applying transfer sections 27, 28 which have a twisted track. The screen cloth flaps 19 on opposite sides of the screen cloth are then also rotated, preferably towards a region above or onto the portion of the screen cloth 7 that is located in-between the strips 21. The strips 21 thus set-up may then be inserted into the undercut chambers 20, and indeed at the free open longitudinal ends 25 of the screen sections 8, 18. The screen cloth 7 and the screen cloth flaps 19 thereby end up in the longitudinal opening 23 of these screen sections 8, 18 as shown in FIG. 4.

By means of the tensioning device 29 (see FIG. 2), the assembly can then be further pulled into the undercut chambers 20 of the screen sections 8, 18, whereby the roll 11 is gradually unrolled.

Although in the shown embodiments, the undercut chamber 20 is integrally formed with the screen section 8, 18 implemented as a whole, it is also possible to accommodate this chamber in a screen section that is in turn connected with a main section, for example by means of a clip connection.

Figure 5:
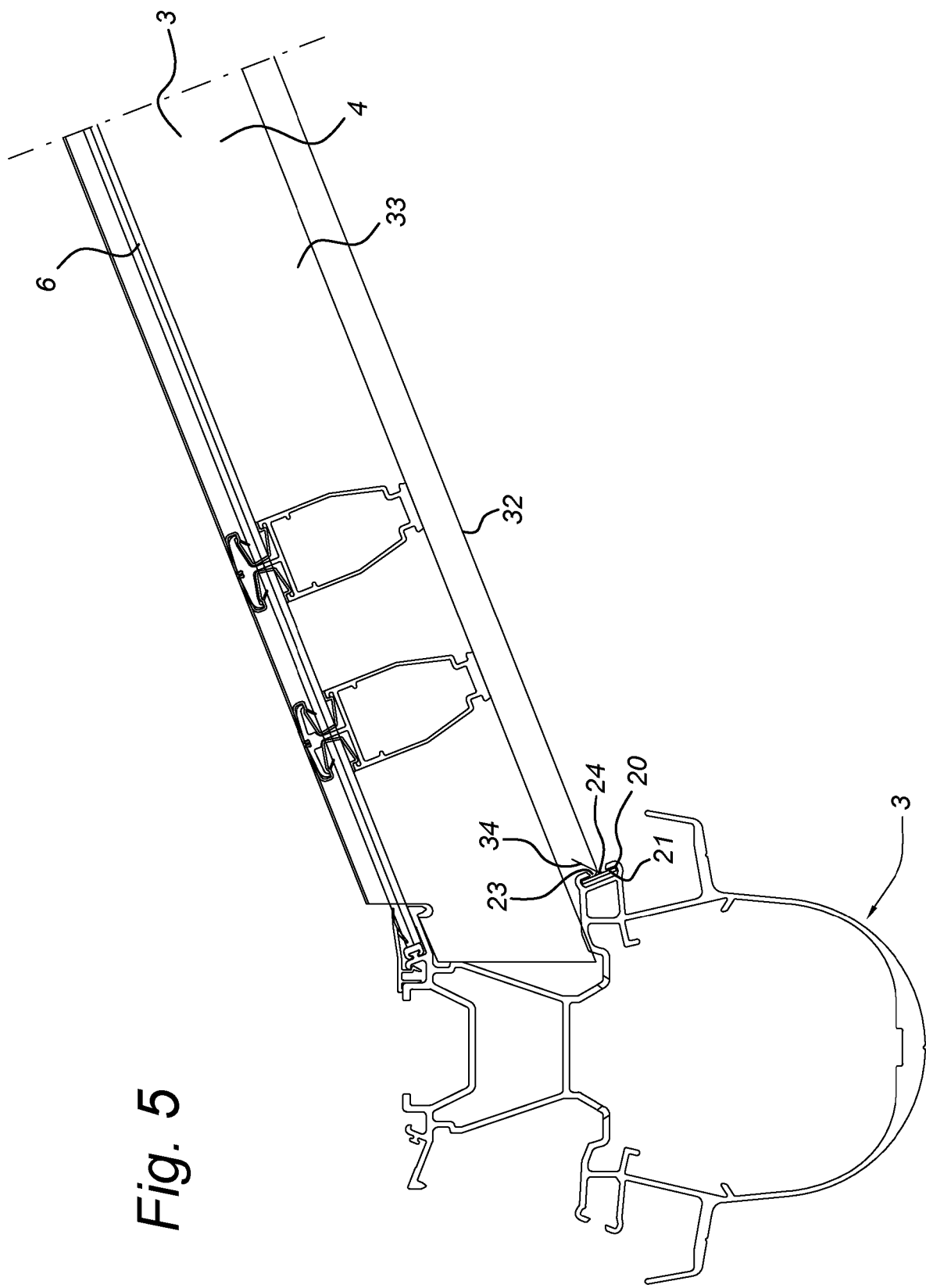
FIG. 5 shows a greenhouse with an insulation layer according to an embodiment.

In FIG. 5, a detail is shown of a greenhouse in which under the glass panels 6 a film layer 32 is tensioned. Between this film layer 32 and the glass panels, a cavity 33 is thus formed that creates an insulating effect. In the detail of FIG. 5, the fastening of the film to the gutter 3 is shown; the opposite side of the film 32 is fastened in the same way (not shown) to the ridge of the greenhouse. Also here, the film flap 34 protrudes outwards, so that only parts of the strip 21 are in contact with the internal walls of the undercut chamber 20 which, in this example, forms an integral part of the gutter 3. Also, a separate section (not shown) can be fastened with such an undercut chamber to the gutter.

It will be clear that the embodiments described above are only described by way of example and do not limit interpretation, and that various changes and adaptations are possible without coming outside the scope of the invention and that the scope is only determined by the attached claims.

LIST OF REFERENCE SYMBOLS

1. Column
2. Rafter
3. Gutter
4. Rod
5. Ridge
6. Glass plate

7. Screen cloth
8. Moveable screen section
9. Heating pipes or rails
10. Vehicle
11. Roll with assembly 22
12. Wheels
13. Screen installation
14. Supporting beam or under-girder
15. Coupling
16. Wire-shaped driving means
17. Supporting wire
18. Fixed screen section
19. Screen cloth flap
20. Undercut chamber
21. Strip
22. Assembly
23. Longitudinal opening of chamber
24. Fastening of strip in the screen cloth
25. Open longitudinal end of the screen section
26. Lip of moveable screen section
27. Right transitional section
28. Curved transitional section
29. Tensioning device
30. Main surface of strip (for attaching screen)
31. Main surface of strip (free)
32. Film
33. Cavity
34. Film flap

The invention claimed is:

1. A fastening system, comprising a flexible sheet member and at least one flat strip attached to the sheet member,
said at least one flat strip having main surfaces that face away and are mutually parallel,
as well as at least one fastening section that has an undercut chamber and a longitudinal opening that opens into this chamber,
wherein the strip is accommodated in the chamber of the fastening section, in such a way that one of the main surfaces thereof faces towards the longitudinal opening and the other main surface faces away from the longitudinal opening, and so that the sheet member attached to the strip does not come into contact with inner walls of the chamber and extends out of the fastening section through the longitudinal opening thereof,
wherein the sheet member is fastened to the main surface of the strip facing towards the longitudinal opening at a fastening position that is located at the level of the longitudinal opening, and keeping free at least the other main surface of the strip, and
wherein the strip extends over the entire length of the flexible sheet member and is located at a distance from a free edge of the sheet member forming a free flap which is defined between the strip and the free edge of the sheet member, wherein the free flap extends at least out of the chamber into the longitudinal opening.

2. The fastening system according to claim 1, wherein the flap extends from the longitudinal opening towards the outside.

3. The fastening system according to claim 1, wherein the surface of the strip facing towards the longitudinal opening abuts against, or can be brought to directly abut against, an internal surface of the chamber on opposite sides of the longitudinal opening thereof.

4. The fastening system according to claim 1, wherein the flat strip has a total thickness dimension that is at least one order of magnitude smaller than the width thereof.

5. The fastening system according to claim 1, wherein the flexible sheet member is fastened to the strip by means of a fastening, as obtained by stitching, adhesion, melting, or riveting.

6. The fastening system according to claim 5, wherein the fastening extends essentially in the centre of the strip, viewed from the widthwise direction of the strip.

7. The fastening system according to claim 5, wherein the flexible sheet member and the strip are stitched together.

8. The fastening system according to claim 1, wherein the undercut chamber of the fastening section has an essentially rectangular or square internal transverse cross-section.

9. The fastening system according to claim 1, wherein the longitudinal opening is located essentially in the middle of one of a plurality of walls that delimit the chamber.

10. The fastening system according to claim 1, wherein the widthwise direction of the strip is oriented transversely with respect to the flexible member.

11. The fastening system according to claim 1, wherein the transverse cross-sectional dimensions of the strip and the transverse cross-sectional dimensions of the undercut chamber are selected in such a way that the strip is locked into the chamber to prevent the strip from leaving the chamber via the longitudinal opening thereof.

12. The fastening system according to claim 11, wherein the undercut chamber of each fastening section is open on at least one longitudinal end thereof, for sliding a strip into the chamber with the flexible member and flap attached to the strip.

13. A method for assembling a fastening system according to claim 1, comprising:
creating an assembly comprising a flexible sheet member and at least one flat strip fastened to the flexible sheet member which strip is fastened at a distance from the adjacent free edge of the flexible sheet member forming a free flap,
providing a fastening section that has an undercut chamber and a longitudinal opening that opens out into this chamber,
inserting the assembly into the free longitudinal end of the fastening section so that one end of the strip and the flexible sheet member fastened thereto and the flap fastened thereto reach into a longitudinal end of the fastening section, and the screen protrudes outwards from the longitudinal opening,
moving the assembly thus inserted into the fastening section along the fastening section.

14. The method according to claim 13, comprising:
providing an assembly in the form of a roll, the roll centreline of which is oriented transversely to the longitudinal direction of the strip,
placing the roll close to a free longitudinal end of the fastening section,
unrolling the assembly of the roll and transferring the unrolled end of the assembly to the free or open longitudinal end of the fastening section.

15. The method according to claim 14, comprising:
after unrolling the assembly, orienting the widthwise direction of the strip transversely with respect to the screen,
folding or turning over the flap with respect to the flexible sheet member,
subsequently introducing the strip into the fastening section.

16. A greenhouse or warehouse comprising a roof, a supporting structure on which the roof is supported, as well as a fastening system, wherein the fastening system comprises a flexible sheet member with flat strips attached to the sheet member, wherein each of said flat strips has main surfaces that face away and are mutually parallel, and fastening sections, each having an undercut chamber and a longitudinal opening that opens into this chamber, wherein the flexible sheet member is suspended on opposite edges thereof on the supporting structure in each case by means of one of said strips that is accommodated in the chamber of one of said fastening sections, in such a way that one of the main surfaces of said strip faces towards the longitudinal opening and the other main surface faces away from the longitudinal opening, and so that the sheet member attached to the strip extends out of the fastening section at least into the longitudinal opening thereof and does not contact any interior walls of the chamber, wherein the sheet member is fastened to the main surface of the strip facing towards the longitudinal opening at a fastening position that is located at the level of the longitudinal opening, and keeping free at least the other main surface of the strip, and wherein the strip extends over the entire length of the flexible sheet member and is located at a distance from a free edge of the sheet member forming a free flap which is defined between the strip and the free edge of the sheet member, which flap extends from the fastening position on the strip out of the chamber at least into the longitudinal opening.

17. The greenhouse or warehouse according to claim 16, wherein the screen is essentially horizontally-oriented, wherein the supporting structure is provided with mutually parallel beams, between which an essentially horizontal wire apron with mutually parallel wires is tensioned, and wherein the fastening sections are oriented transverse, preferably perpendicular, with respect to the wires of the wire apron, wherein the screen and at least one of the fastening sections, which at least one fastening section is implemented as a screen section, are supported by the wire apron so that they can be displaced back and forth, as well as a driving means for displacing the at least one screen section and the screen back and forth.

18. The greenhouse or warehouse according to claim 16, wherein the roof comprises gutters and a ridge supported at a higher level than the gutters by means of rods between the gutters, wherein panels are accommodated between the ridge, the respective gutter, and the rods that extend from the gutter to the ridge, to form a roof part, and wherein the flexible sheet member extends at a distance from and essentially parallel to the roof part, thereby forming a cavity between the roof part and the flexible sheet member, which flexible sheet member is fastened in each case onto or close to the gutter and the ridge by means of a respective fastening system.

19. An assembly for use in a greenhouse or warehouse, comprising a flexible sheet member and at least one flat strip, which is fastened to the flexible sheet member, and which defines first and second main surfaces that face away and are mutually parallel, wherein the strip extends over the entire length of the flexible sheet member, wherein the flexible sheet member is fastened to the first main surface of the strip by means of a linear fastening obtained by stitching which extends essentially in the centre of the strip, viewed in the widthwise direction of the strip, and wherein the second main surface of the strip is kept free, and wherein the strip is located at a distance from a free edge of the sheet member forming a free flap which is defined between the strip and the free edge of the sheet member such that the sheet member does not come into contact with any internal walls of a chamber with a longitudinal opening in which the strip is inserted for use in the greenhouse wherein the free flap extends at least out of the chamber into the longitudinal opening.

20. The assembly according to claim 19, which is rolled up around a centreline that extends transversely with respect to the longitudinal direction of the screen, to form a roll.

\* \* \* \* \*